United States Patent
Matsue

(10) Patent No.: US 9,234,767 B2
(45) Date of Patent: Jan. 12, 2016

(54) RUNNING CONDITION DETECTION DEVICE, RUNNING CONDITION DETECTION METHOD, AND RECORDING MEDIUM

(71) Applicant: CASIO COMPUTER CO., LTD., Shibuya-ku, Tokyo (JP)

(72) Inventor: Takeshi Matsue, Fussa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 14/168,711

(22) Filed: Jan. 30, 2014

(65) Prior Publication Data

US 2014/0214316 A1    Jul. 31, 2014

(30) Foreign Application Priority Data

Jan. 31, 2013    (JP) .................. 2013-016954

(51) Int. Cl.
G01C 22/00 (2006.01)
G01C 21/00 (2006.01)
G01C 21/16 (2006.01)

(52) U.S. Cl.
CPC ............ *G01C 22/006* (2013.01); *G01C 21/165* (2013.01)

(58) Field of Classification Search
CPC .. G01C 21/3415; G01C 21/34; G01C 22/006; G01C 21/165
See application file for complete search history.

(56) References Cited

U.S. PATENT DOCUMENTS

| 5,463,554 | A | * | 10/1995 | Araki et al. | ................... | 701/443 |
| 8,855,928 | B2 | | 10/2014 | Sambongi | | |
| 2001/0037173 | A1 | * | 11/2001 | Sekine | .......................... | 701/200 |
| 2006/0100778 | A1 | * | 5/2006 | Lee et al. | ....................... | 701/210 |
| 2012/0036229 | A1 | * | 2/2012 | Uyama et al. | ................. | 709/219 |

FOREIGN PATENT DOCUMENTS

| CN | 102385050 A | 3/2012 |
| JP | 05-018773 A | 1/1993 |
| JP | 2010-008095 A | 1/2010 |

OTHER PUBLICATIONS

Chinese Office Action (and English translation thereof) dated Oct. 10, 2015, issued in counterpart Chinese Application No. 201410044176.7.

* cited by examiner

*Primary Examiner* — Calvin Cheung
*Assistant Examiner* — Martin Weeks
(74) *Attorney, Agent, or Firm* — Holtz, Holtz, Goodman & Chick PC

(57) ABSTRACT

A running condition detection device includes
  a GPS receiving unit configured to receive a GPS signal and output a current position,
  a geomagnetic sensor configured to detect geomagnetism,
  a direction determination unit configured to obtain a current moving direction based on current positional data and last positional data from the GPS receiving unit,
  a first bend determination unit configured to compare current moving direction data obtained by the direction determination unit and reference direction data to determine passage of a street corner,
  a second bend determination unit configured to compare geomagnetic data detected by the geomagnetic sensor and reference geomagnetic data to determine passage of a street corner, and
  a determination prohibition unit which prohibits the first and second bend determination units from determining passage of a street corner during a given period of time when passage of a street corner is determined by one of the first bend determination unit and the second bend determination unit.

15 Claims, 12 Drawing Sheets

FIG.6

GPS REFERENCE DIRECTION/ CURRENT DIRECTION — 23e

BEND DETECTION THRESHOLD VALUE 50°

| COUNTER | HEADING [deg] (REFERENCE VALUE) | HEADING [deg] (CURRENT VALUE) |
|---|---|---|
| 0 | 55 | 55 |
| 1 | 55 | 62 |
| 2 | 55 | 62 |
| 3 | 55 | 57 |
| ⋮ | ⋮ | ⋮ |
| 55 | 55 | 108 |
| 56 | 108 | 121 |
| 57 | 108 | 134 |
| 58 | 108 | 128 |
| 59 | 108 | 130 |
| 60 | 108 | 131 |
| 61 | 108 | 123 |

GEOMAGNETIC REFERENCE VALUE/ CURRENT VALUE — 23g

BEND DETECTION THRESHOLD VALUE 50 μT (APPLIED TO EACH XYZ AXIS)

| COUNTER | GEOMAGNETISM [μT] (REFERENCE VALUE) | GEOMAGNETISM [μT] |
|---|---|---|
| 0 | 10 | 10 |
| 1 | 10 | 11 |
| 2 | 10 | 9 |
| 3 | 10 | 11 |
| ⋮ | ⋮ | ⋮ |
| 55 | 10 | 27 |
| 56 | 27 | 25 |
| 57 | 27 | 26 |
| 58 | 27 | 28 |
| 59 | 27 | 26 |
| 60 | 27 | 26 |
| 61 | 27 | 26 |

23h

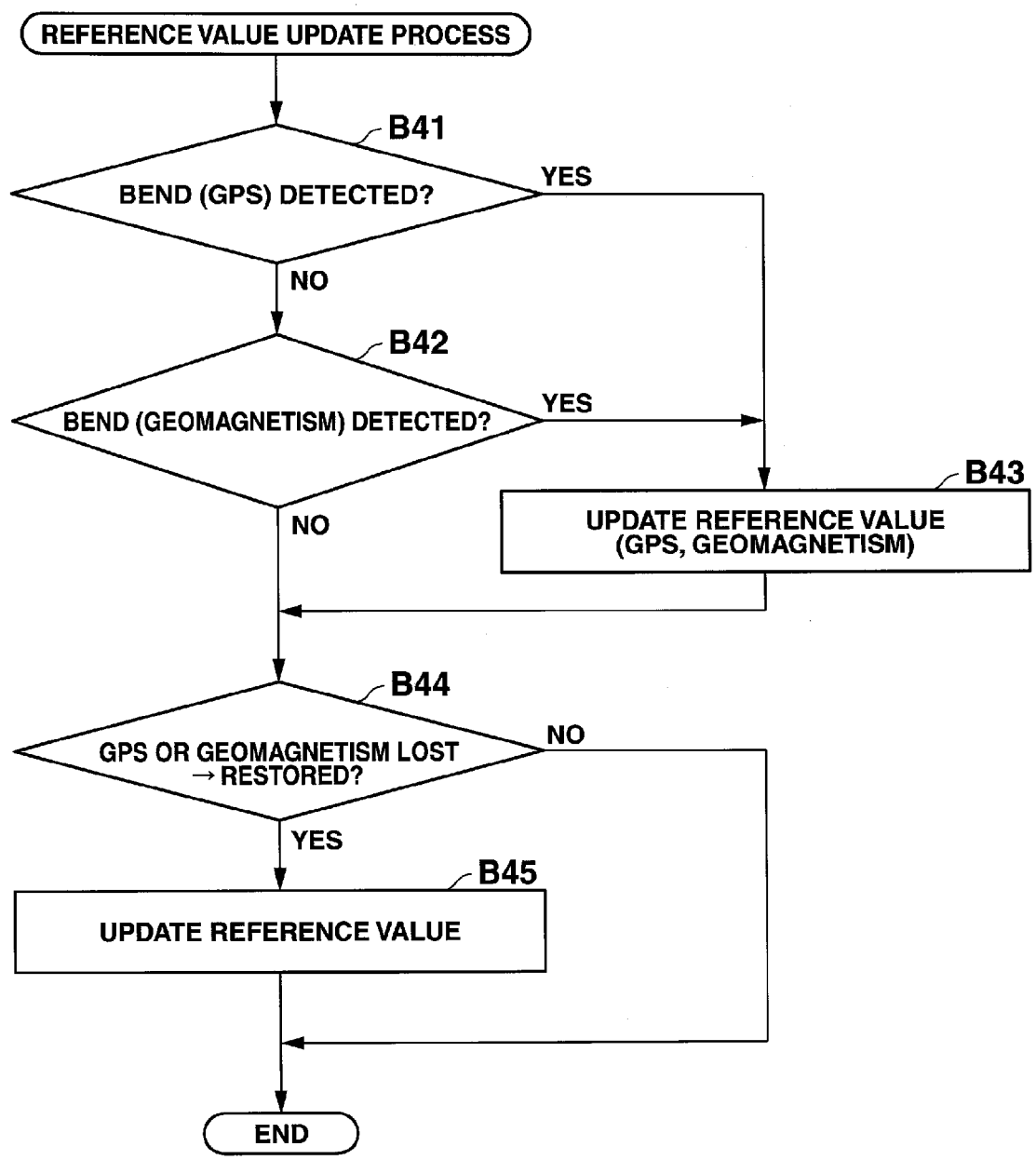

RUNNING CONDITION DETECTION DEVICE, RUNNING CONDITION DETECTION METHOD, AND RECORDING MEDIUM

BACKGROUND

1. Technical Field

The present invention relates to a running condition detection device and a running condition detection method and a recording medium for detecting and reporting where the current position is located in a predetermined route.

2. Related Art

In recent years, more and more people have been enjoying running, such as jogging as a daily routine and taking part in a marathon event. A small, global positioning system (GPS)-equipped electronic device that such a runner wears for recording a run course and time is available on the market.

Typical GPS receivers show variations in precision of positional data acquired by the GPS. For example, even when a mobile body from which positional data is to be acquired is running in a straight line, the positional data is acquired at regular intervals, swaying to the right and left of the straight line.

Accordingly, when a moved distance of the runner is measured by taking a difference of the positional data acquired at regular intervals, the moved distance is measured longer than an actual distance.

In order to reduce such an error in the measurement distance, measurement without including great variations in the positional data can be considered by skipping the positional data to be used at preset time intervals or moved distance intervals, the positional data being acquired at regular intervals.

However, for example, when the positional data is skipped in a situation where the runner is passing a street corner, another problem arises that the moved distance cannot be measured in accordance with the corner because the positional data takes a shortcut between before and after the street corner.

A vehicle position correction system that corrects a vehicle position calculated from a detection output of a GPS sensor in accordance with a detection output of a distance sensor and a direction sensor is considered (for example, refer to JP 2010-008095 A).

An on-board navigation system that corrects a vehicle position calculated from a detection output of a GPS sensor in accordance with a detection output of a geomagnetic sensor is considered (for example, refer to JP 05-018773 A).

For example, a marathon course prescribes whether runners must run along a left line, a right line, or a central line on each road included in the course. Accordingly, predetermined distances of marathons, such as a full marathon and a half marathon, are established. A distance from a start position to each check position is established by defining each street corner included in the course as a check position.

In contrast, runners do not necessarily run precisely along the prescribed line on each road in the marathon course. Runners sometimes run in a zigzag direction or run along an opposite line, leading to a gap between the prescribed distance on the course and the runner's moved distance as a natural consequence. Moreover, as described above, the moved distance measured based on the positional data from the GPS receiver that the runner carries, which is longer than the actual distance, does not coincide as-is with the prescribed distance on the course.

Therefore, the measurement precision of the moved distance can be improved by correcting the moved distance measured based on the GPS receiver at each street corner (check position) based on the distance data established in the marathon course along which runners run. For that purpose, accurate detection of each street corner (bend position) on the course is required.

The present invention has been made in view of the above problems, and an object of the present invention is to provide a running condition detection device and method for allowing accurate detection of a street corner that runners run.

SUMMARY

A running condition detection device according to the present invention includes:

a GPS receiving unit which receives a GPS signal and outputs a current position;

a geomagnetic sensor which detects geomagnetism;

a direction determination unit which obtains a current moving direction based on current positional data and last positional data from the GPS receiving unit;

a first bend determination unit which compares current moving direction data obtained by the direction determination unit and reference direction data to determine passage of a street corner;

a second bend determination unit which compares geomagnetic data detected by the geomagnetic sensor and reference geomagnetic data to determine passage of a street corner; and a determination control unit which prohibits the first and second bend determination units from determining passage of a street corner during a given period of time after passage of a street corner is determined by one of the first bend determination unit and the second bend determination unit, and to maintain determination of passage of a street corner by the first and second bend determination units when determination is not prohibited.

The present invention allows accurate detection of a street corner that runners run.

BRIEF. DESCRIPTION OF THE DRAWINGS

Figure 4:
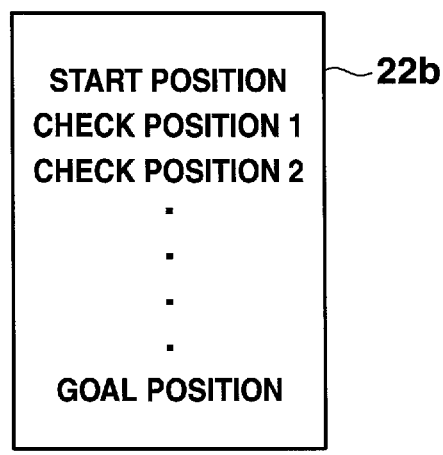
Figure 5:
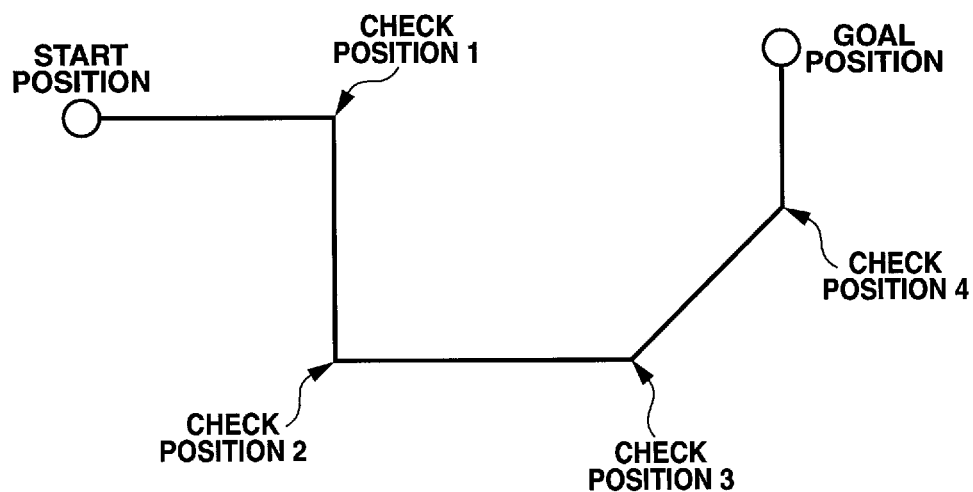
Figure 8:
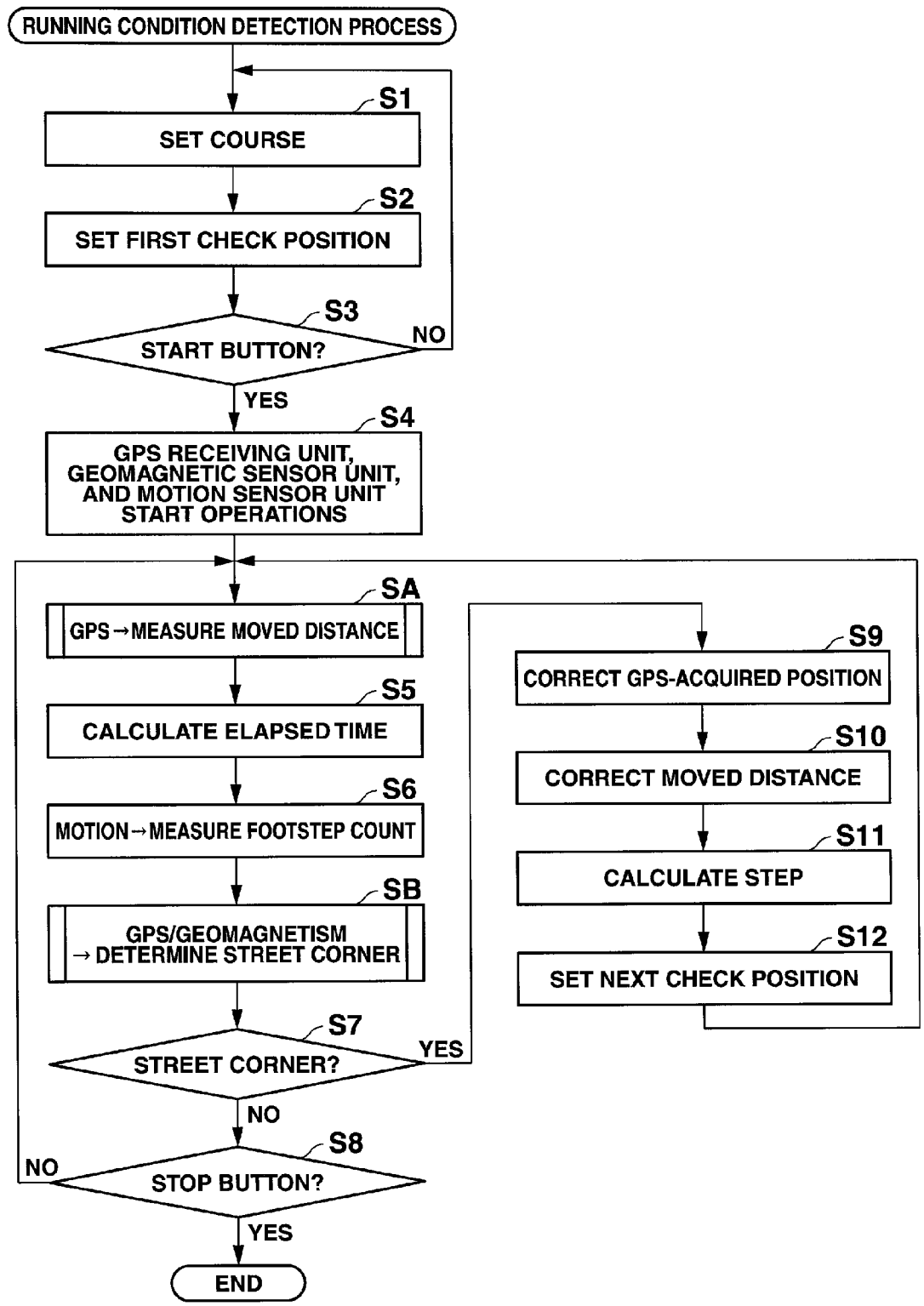
Figure 9:
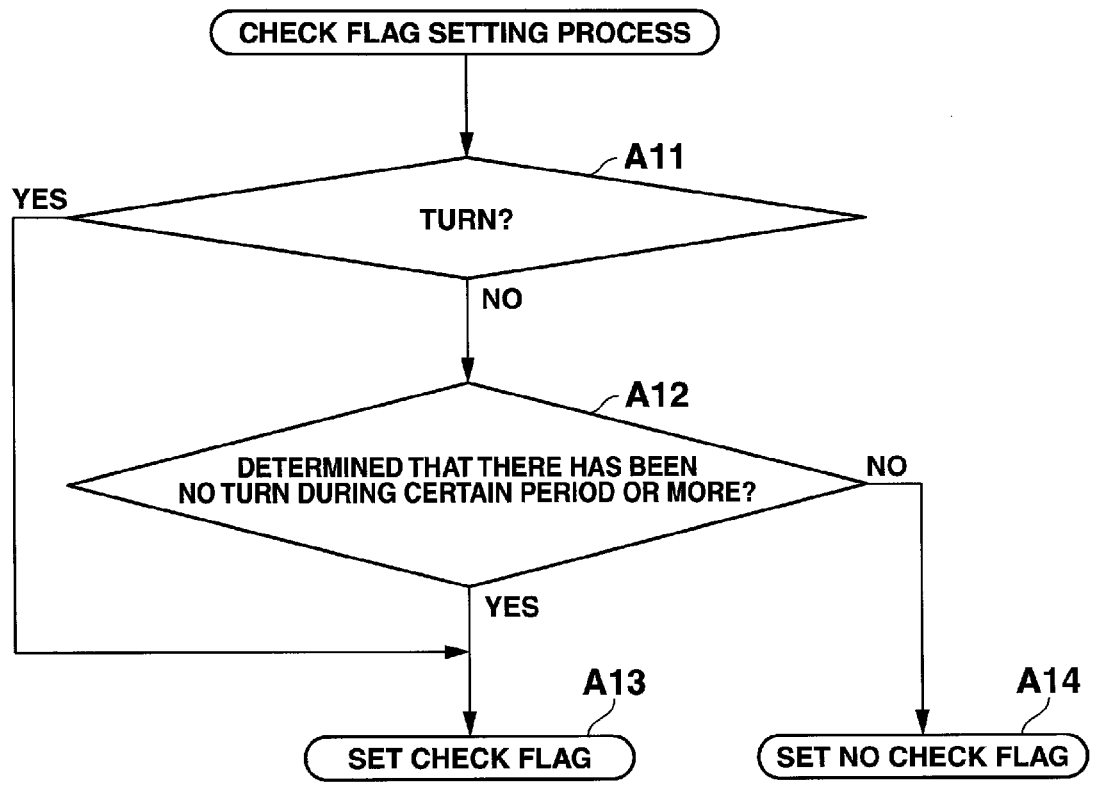
Figure 10:
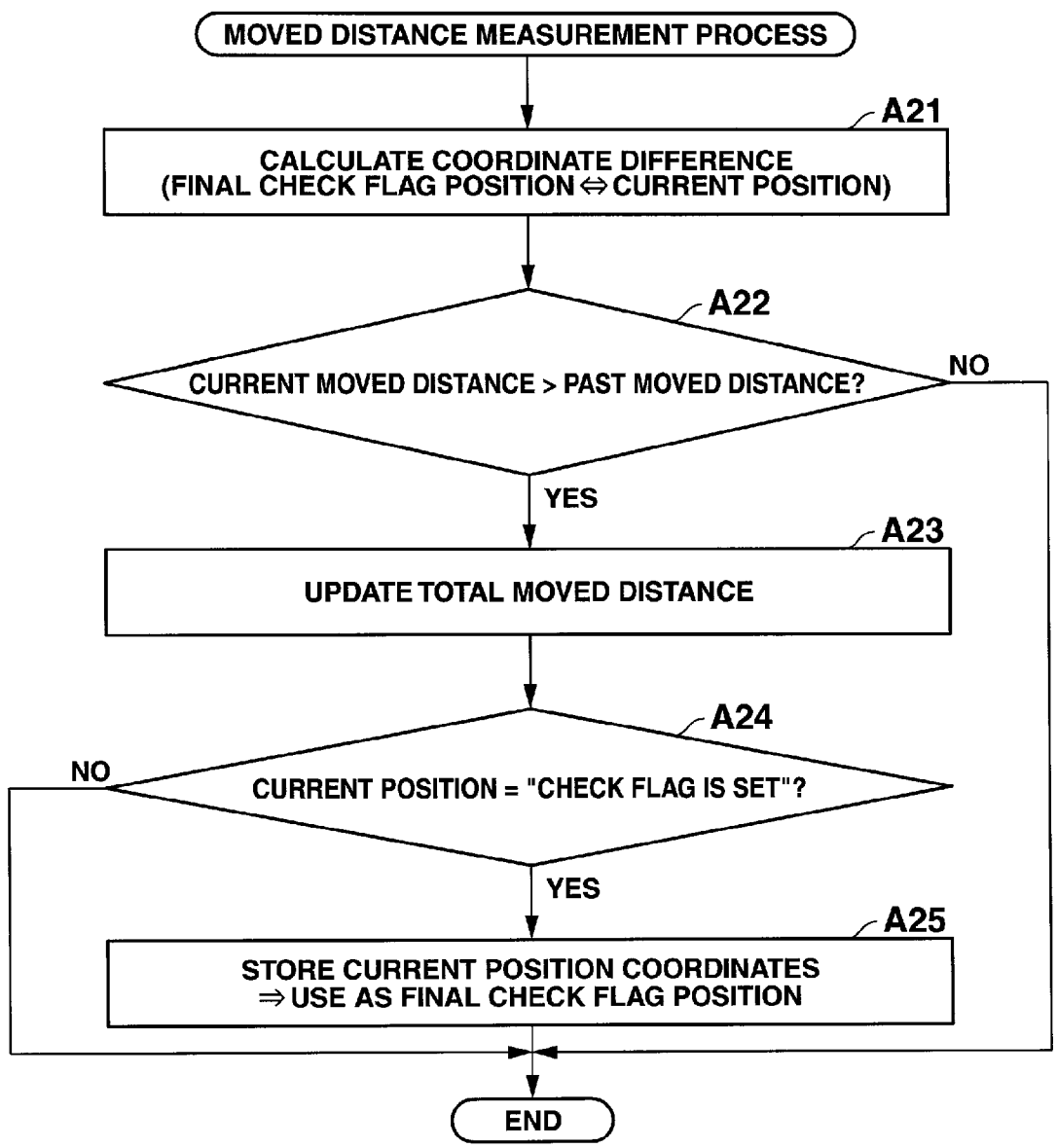
Figure 11:
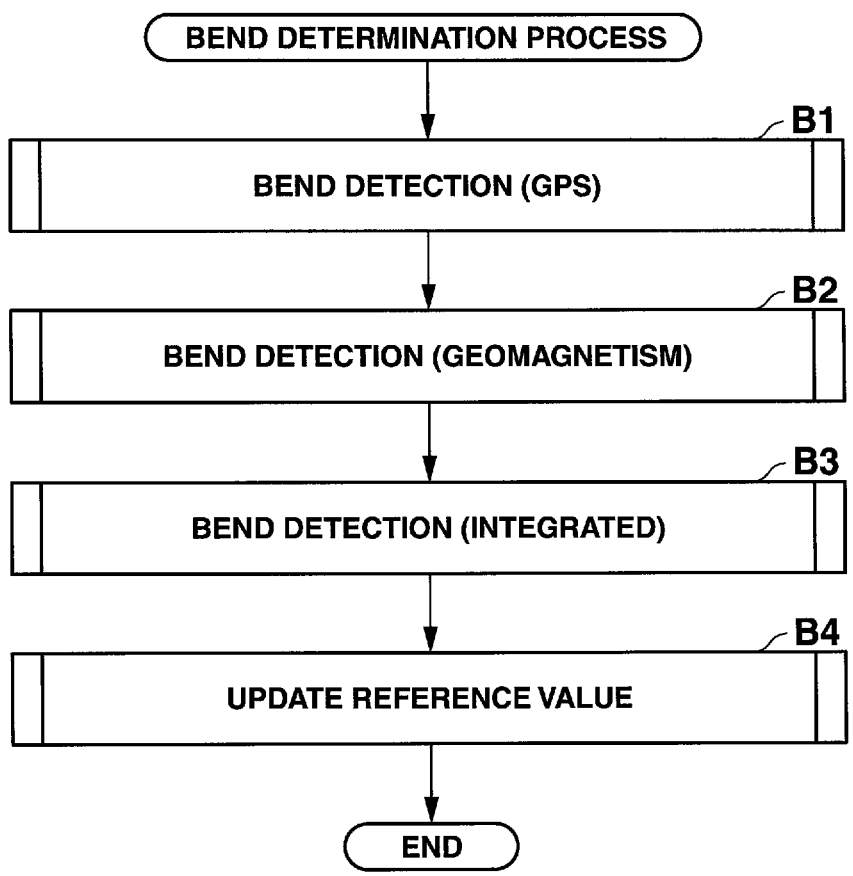
Figure 12:
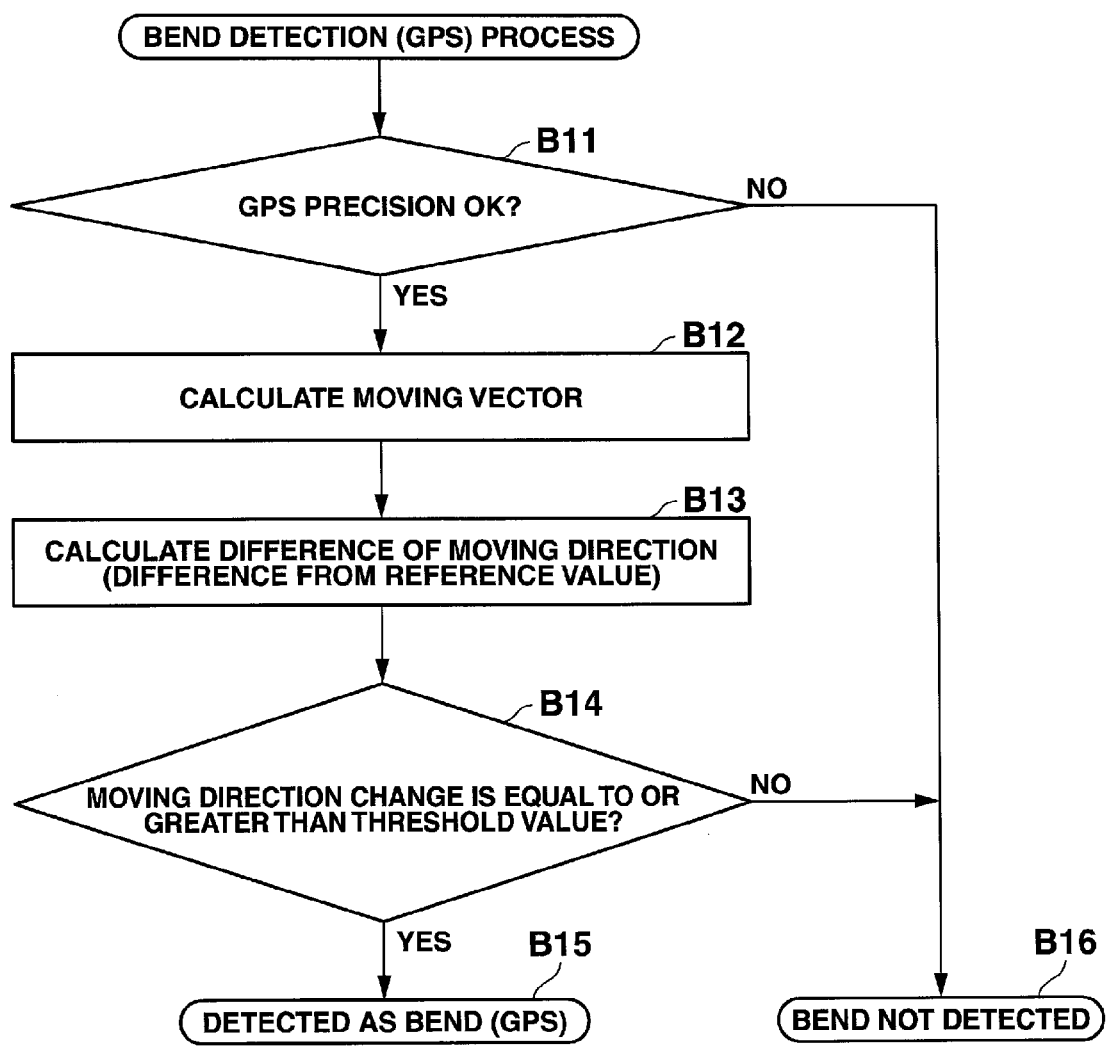
Figure 13:
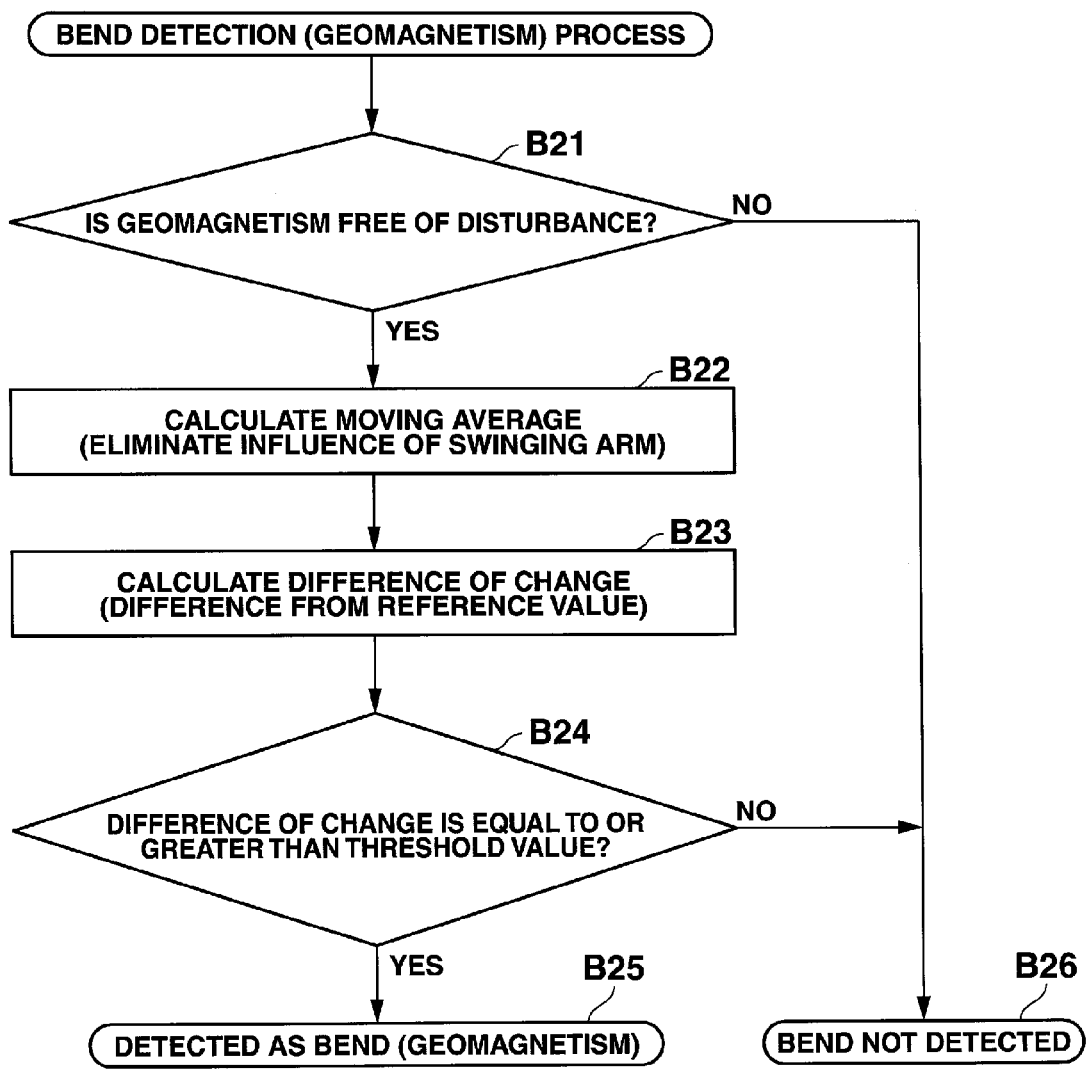
Figure 14:
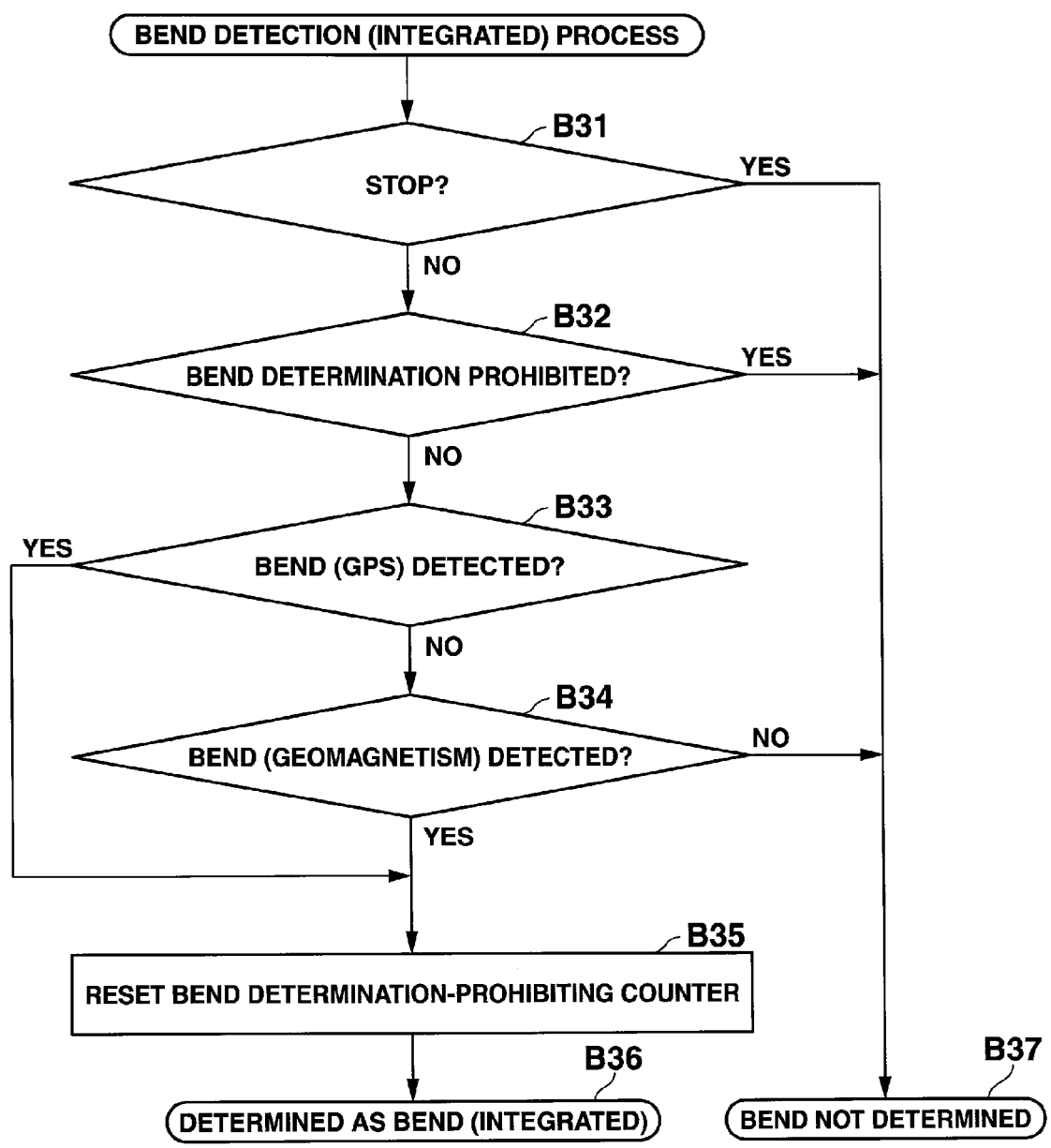

FIG. 4 is a diagram illustrating an item of map data 22b stored in a storage device 22 of the electronic device 10;

FIG. 5 is a schematic diagram illustrating an example of a running course stored in the storage device 22 of the electronic device 10 as the map data 22b;

FIG. 6 is a diagram illustrating a data storage condition in a GPS reference direction memory 23e of the electronic device 10;

FIG. 7 is a diagram illustrating a data storage condition in a geomagnetic reference value memory 23g of the electronic device 10;

FIG. 8 is a flow chart illustrating a running condition detection process performed in accordance with a control program 22a of the electronic device 10;

FIG. 9 is a flow chart illustrating a check flag setting process of the electronic device 10;

FIG. 10 is a flow chart illustrating a moved distance measurement process of the electronic device 10;

FIG. 11 is a flow chart illustrating an overall process of a bend determination process of the electronic device 10;

FIG. 12 is a flow chart illustrating a GPS bend detection process of the electronic device 10;

FIG. 13 is a flow chart illustrating a geomagnetism bend detection process of the electronic device 10;

FIG. 14 is a flow chart illustrating an integrated bend detection process of the electronic device 10; and FIG. 15 is a flow chart illustrating a reference value update process of the electronic device 10.

DETAILED DESCRIPTION

Figure 1:
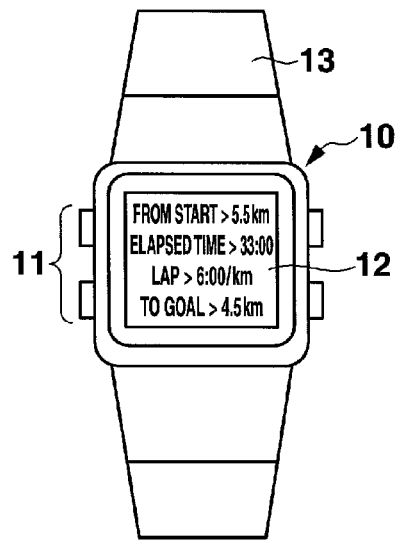
FIG. 1 is a front view illustrating an appearance configuration of a wristwatch-type electronic device 10 according to embodiments of a running condition detection device of the present invention.

Embodiments of the present invention will be described below with reference to the drawings. FIG. 1 is a front view illustrating an appearance configuration of a wristwatch-type electronic device 10 according to the embodiments of a running condition detection device of the present invention.

The running condition detection device can be achieved by a portable terminal-type electronic device, such as a mobile phone, a handheld game machine, and a portable personal computer (PC), besides the wristwatch-type electronic device 10 described below.

A key input unit 11 having a plurality of buttons for performing various mode settings, instructions of setting the time, instructions of start/stop, and the like is provided on a side of a body of the electronic device 10. In addition, a display unit 12 for displaying content depending on the preset mode is provided on a front surface of the body. A reference numeral 13 is a wristband.

The electronic device 10 has a function suitable for the use by a runner, such as a function to display a course map when the runner runs the preset course, a function to display how many kilometers from a start on the course the runner is located, a function to display elapsed time, a function to display how many kilometers there are from a current position on the course to a next checkpoint or goal, and a function to display transit time per unit distance (lap time).

Figure 2:
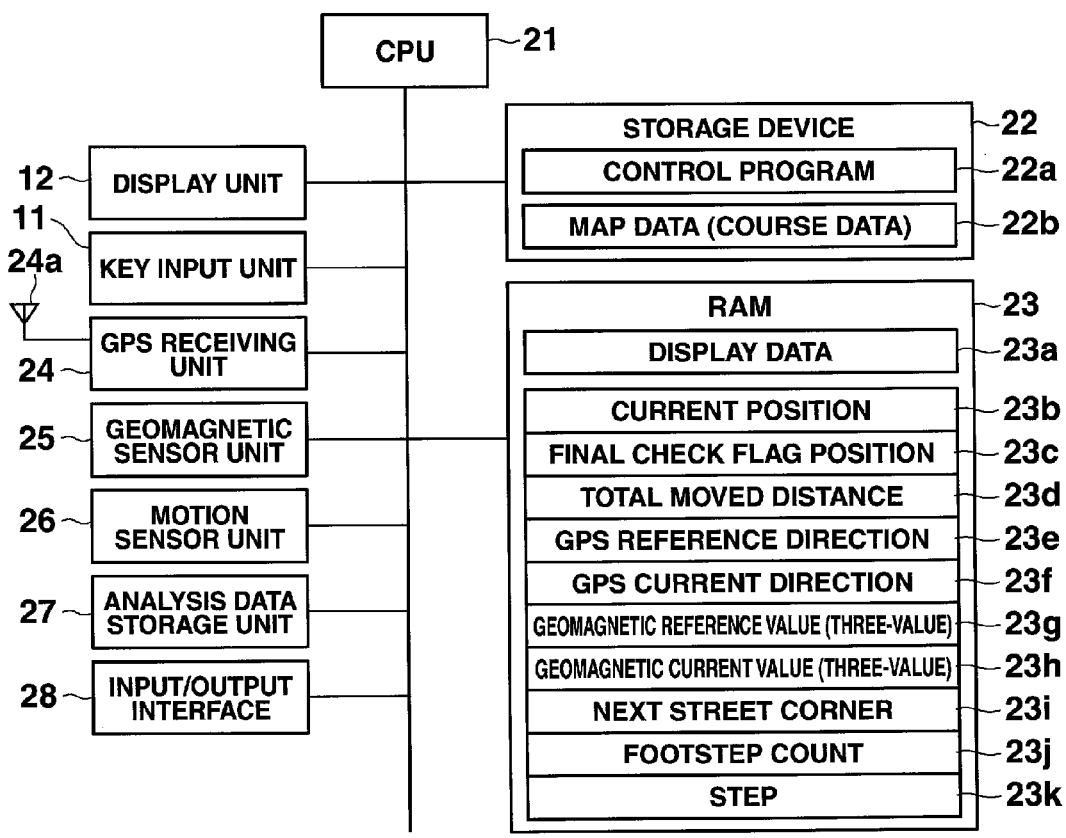
FIG. 2 is a block diagram illustrating a configuration of an electronic circuit of the electronic device 10.

FIG. 2 is a block diagram illustrating a configuration of an electronic circuit of the electronic device 10.

The electronic circuit of the electronic device 10 includes a central processing unit or CPU (a control unit) 21 which is a computer.

The CPU 21 controls operations of each part of the circuit by using a random access memory (RAM) 23 as a working memory, and performs various functions in accordance with an electronic device control program 22a stored in a storage device 22 in advance or an electronic device control program 22a loaded from outside via an input/output interface 28 and stored in the storage device 22. The program 22a performs a process in accordance with a user operation signal from a key input unit 11, positioning (latitude and longitude) data at a current point based on reception by a GPS receiving unit 24, each of three-axis (X-axis, Y-axis, Z-axis) geomagnetic data from a geomagnetic sensor unit 25, various sensor signals from a motion sensor unit 26 in accordance with a motion of the user, or a communication signal from an external apparatus via the input/output interface 28.

The GPS receiving unit 24 receives an electric wave signal from a plurality of GPS satellites with an antenna 24a, demodulates the signal, and outputs information, such as latitude and longitude of the current point and time, every second as positioning data.

Figure 3:
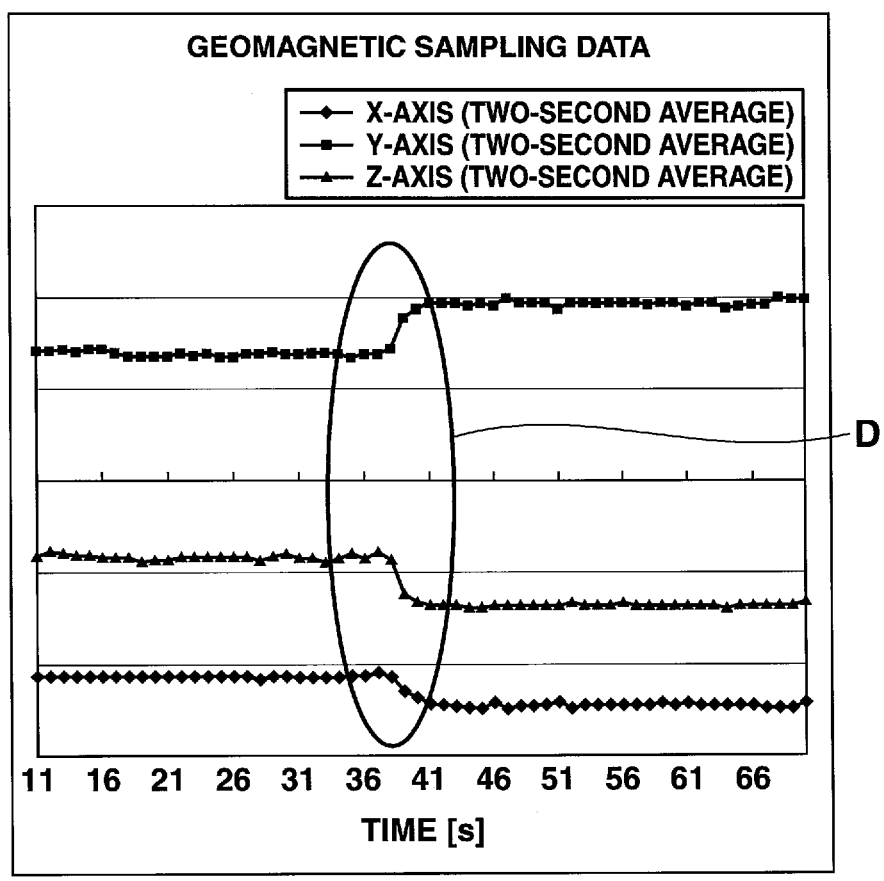
FIG. 3 is a diagram illustrating a specific example of each of three-axis geomagnetic data output from a geomagnetic sensor unit 25 of the electronic device 10.

FIG. 3 is a diagram illustrating a specific example of each of the three-axis geomagnetic data sampled and output from the geomagnetic sensor unit 25 of the electronic device 10.

The geomagnetic sensor unit 25 has a three-axis geomagnetic sensor. For example, the geomagnetic sensor unit 25 averages, in two seconds, each of the three-axis (X-axis, Y-axis, Z-axis) geomagnetic data measured every 0.2 second to eliminate noise generated under the influence of swinging an arm or for other reasons. The geomagnetic sensor unit 25 then outputs, every second, each of the geomagnetic data [μT] averaged in two seconds. The geomagnetic sensor unit 25 detects, as a street corner, a portion in which variations of two axes are larger than a threshold value, as illustrated in a portion encircled by a range D, among each of the geomagnetic data output from the geomagnetic sensor unit 25.

The motion sensor unit 26 has an accelerometer and a gyroscope sensor, and measures or detects and outputs data such as a movement size, a direction change, and a motion of walking associated with the user's movement based on each of the sensor signals.

The input/output interface 28 is connected to, for example, an external PC, and inputs and outputs various data directly with the external PC or with a server device on the Internet via the external PC.

FIG. 4 is a diagram illustrating an item of map data (course information) 22b stored in the storage device 22 of the electronic device 10.

FIG. 5 is a schematic diagram illustrating an example of a running course stored in the storage device 22 of the electronic device 10 as the map data (course information) 22b.

In addition to the electronic device control program 22a, the storage device 22 stores the map data (course information) 22b of a plurality of running courses, such as, for example, a jogging course and an exercise course for a marathon event before the user runs. As illustrated in FIGS. 4 and 5, for example, the data includes positional data from a start position to each check position (a street corner in the present embodiments) which is a mid-course transit point, and to a goal position. Each positional data includes latitude and longitude data of each position and distance data indicating a distance from the start position. The map data (course information) 22b is prepared by the user from a map displayed in a PC with predetermined software, or provided as data from sources such as an event organizer, and stored in the storage device 22 via the input/output interface 28 of the electronic device 10. The distance data may not be converted into digital data in advance, and may be calculated during a process based on the latitude and longitude data.

The RAM 23 includes a display data memory 23a, a current position memory 23b, a final check flag position memory 23c, a total moved distance memory 23d, a GPS reference direction memory 23e, a GPS current direction memory 23f, a geomagnetic reference value memory 23g, a geomagnetic current value memory 23h, a next street corner memory 23i, a footstep count memory 23j, and a step memory 23k.

Display data for the display unit 12 is converted into bitmap image data and stored in the display data memory 23a.

The current position memory 23b stores, for example, a moving position of the user (runner) according to the running course selected from the map data (course information) 22b. As the moving position, positional data according to the positioning data from the GPS receiving unit 24 is stored.

A moved distance may be calculated with a difference between the current positional data obtained from the GPS receiving unit 24 and last positional data, and a total moved distance may be calculated by adding the difference. However, a variation (error) of each positional data accumulates, leading to an error from an actual total moved distance. In order to reduce the error, a check flag is set in the positional data obtained every second from the GPS receiving unit 24 at regular intervals (for example, four seconds) during straight running. A moved distance calculated from a difference between the positional data in which the check flag is set is regarded as valid. In a case where the runner passes a street corner in the middle of the above-described interval, in order to prevent calculation with a moved distance of the interval being shortcut, when passage determination of a street corner described later is made, a check flag is set also in positional data obtained from the GPS receiving unit 24 at that time. This allows calculation of the moved distance by making the positional data including the error obtained from the GPS receiving unit 24 a straight shape as much as possible. This also allows precise calculation of the moved distance at a place where the course is bent.

The final check flag position memory 23c stores latest positional data (current position) in which the check flag is set as a final check flag position.

The total moved distance memory 23d stores, for example, a moved distance of the user (runner) in accordance with the running course selected from the map data (course information) 22b.

The electronic device 10 has a function to detect whether a direction in which the runner runs has made a turn based on a change of current direction data [deg] calculated in accordance with the current positional data acquired every second from the GPS receiving unit 24 and last positional data (a change equal to or greater than a threshold value from reference direction data [deg]). The electronic device 10 also has a function to detect whether a direction in which the runner runs has made a turn based on a change of each of the three-axis geomagnetic data [μT] acquired every second from the geomagnetic sensor unit 25 (a change equal to or greater than a threshold value from at least two-axis reference geomagnetic data [μT]).

FIG. 6 is a diagram illustrating a storage condition of the reference direction data in the GPS reference direction memory 23e and the current direction data in the GPS current direction memory 23f of the electronic device 10.

The GPS reference direction memory 23e stores the reference direction data [deg] for detecting a bend of the direction in which the runner runs in accordance with output timing (every second) of the positioning data acquired from the GPS receiving unit 24. The current direction data [deg] is stored as-is as initial reference direction data [deg]. After that, every time a bend is detected, the memory 23e is updated to current direction data [deg] when the bend is detected. In the present embodiments, direction data [deg] refers to a clockwise angle with due north being set to zero.

The GPS current direction memory 23f stores current direction data [deg] calculated based on the current positional data and the last positional data every time positioning data is output from the GPS receiving unit 24 (every second).

The present embodiments assume that a bend detection threshold value based on the positioning data from the GPS receiving unit 24 is set to [50°]. When a change of the current direction data [deg] relative to the reference direction data [deg] is equal to or greater than the bend detection threshold value [50°], it is determined that the runner has passed a street corner.

In the example illustrated in FIG. 6, when initial reference direction data (which is current direction data) is 55 [deg], current direction data calculated by the 55th sampling is 108 [deg], and the change is equal to or greater than the threshold value [50°]. Accordingly, it is detected that the runner has passed a street corner. Then, reference direction data is updated to the current direction data of 108 [deg] when the street corner is detected as new reference direction data.

FIG. 7 is a diagram illustrating one-axis data among storage conditions of the reference geomagnetic data in the geomagnetic reference value memory 23g and current geomagnetic data in the geomagnetic current value memory 23h of the electronic device 10.

The geomagnetic reference value memory 23g stores the reference geomagnetic data [μT] for detecting a bend of a direction in which the runner runs for each of the three axes (X-axis, Y-axis, Z-axis) in accordance with output timing (one second) of the geomagnetic data [μT] acquired from the geomagnetic sensor unit 25. The current geomagnetic data [μT] is stored as-is as initial reference geomagnetic data [μT]. After that, every time a bend is detected, the geomagnetic reference value memory 23g is updated to the current geomagnetic data [μT] when the bend is detected.

The geomagnetic current value memory 23h stores the current geomagnetic data [μT] of each of the three axes (X-axis, Y-axis, Z-axis) averaged in two seconds every time the geomagnetic data is output from the geomagnetic sensor unit 25 (every second).

The present embodiments assume that a bend detection threshold value based on each of the geomagnetic data is set to [15 μT]. When a change of the current geomagnetic data [μT] relative to the reference geomagnetic data [μT] is equal to or greater than the bend detection threshold value [15 μT] for at least two axes thereof, it is determined that the runner has passed a street corner.

In the specific example illustrated in FIG. 7, when the initial reference geomagnetic data (which is the current geomagnetic data) is 10 [μT], the 55th output current geomagnetic data output is 27 [μT], and the variation is equal to or greater than the threshold value [15 μT]. Accordingly, it is detected that the runner has passed a street corner. Then, the reference geomagnetic data is updated to the current geomagnetic data of 27 [μT] when the street corner is detected as new reference geomagnetic data.

The next street corner memory 23i stores positional data (latitude and longitude data) and distance data of a first check position of the map data 22b when the running course is set before running. Subsequently, the user begins running, and every time the user arrives at a check position, latitude and longitude data, and distance data corresponding to a next check position are stored.

The footstep count memory 23j stores footstep count data counted based on a sensor signal output from the motion sensor unit 26 in accordance with the user's motion.

The step memory 23k stores step data calculated based on a moved distance and a footstep count between certain points.

The analysis data storage unit 27 stores data, such as the positioning data from the GPS receiving unit 24, each of the three-axis geomagnetic data from the geomagnetic sensor unit 25, each sensor signal from the motion sensor unit 26, the current position (23b), the total moved distance (23d), the footstep count (23j), the step (23k), the lap time analyzed based on the elapsed time from the start, the distance to the goal, an average speed, and an amount of movement.

The electronic device 10 has a function to classify positioning precision of the positioning data obtained from the GPS receiving unit 24 into "good (sufficient)" and "bad (poor)" to make a determination based on data of a protocol specified by national marine electronics association (NMEA) output from a GPS module depending on conformity to predetermined conditions.

Specifically, for example, a positioning error of 10 m or less is determined to be "good (sufficient)", and a positioning error larger than 10 m is determined to be "bad (poor)".

Regarding each of the three-axis geomagnetic data obtained from the geomagnetic sensor unit 25, the electronic device 10 has a function to determine whether the value of each of the geomagnetic data cannot be used because of disturbance.

Specifically, the presence of disturbance is determined based on whether the square root of the sum of squares of each of the three-axis geomagnetic intensity exceeds a predetermined value.

The electronic device 10 configured in this way achieves the functions described in the following operational description by the CPU 21 controlling operations of each part of the circuit in accordance with a command described in the electronic device control program 22a, and software and hardware operating in cooperation.

Next, a runner support function of the electronic device 10 according to the above configuration will be described.

FIG. 8 is a flow chart illustrating a running condition detection process performed in accordance with the control program 22a of the electronic device 10.

The user operation of the key input unit 11 activates the electronic device control program 22a. Setting an operational mode to a runner support mode resets each data memory 23b to 23k in the RAM 23, and causes a course-setting message urging the user to set the running course along which the user will run subsequently to be displayed on the display unit 12.

In accordance with the course setting message, the running course is set by the user selecting a desired running course from the plurality of map data (course information) 22b stored in the storage device 22 (step S1). Latitude and longitude data and distance data corresponding to a first check position of the set course are stored in the next street corner memory 23i (step S2).

When a start button is pressed at a start position and running starts in accordance with the set course (step S3 (Yes)), the GPS receiving unit 24, the geomagnetic sensor unit 25, and the motion sensor unit 26 start operations (step S4).

In accordance with a moved distance measurement process described later with reference to FIGS. 9 and 10, a moved distance from the running start is then calculated based on positioning data acquired from the GPS receiving unit 24, stored in the total moved distance memory 23d (step SA), and elapsed time is calculated (step S5).

At this time, the display unit 12 displays information such as the moved distance from the start stored in the total moved distance memory 23d, the calculated elapsed time, lap time, a distance to a next check position (CP) obtained by subtracting the total moved distance from the distance data corresponding to the first check position stored in the next street corner memory 23i, and a distance to the goal obtained by subtracting the total moved distance from the distance data of the set course (refer to FIG. 1).

The runner's movement (running) motion is analyzed, and the footstep count from the running start is measured and stored in the footstep count memory 23j based on the sensor signal of the accelerometer acquired from the motion sensor unit 26 (step S6).

Then, it is determined whether the user has made a turn at a street corner in accordance with the bend determination process described later with reference to FIGS. 11 to 15 based on the positioning data acquired from the GPS receiving unit 24 or the geomagnetic data acquired from the geomagnetic sensor unit 25 (step SB).

When it is not determined that the user has made a turn at a street corner (step S7 (No)) and when it is not determined that the stop button is pressed (step S8 (No)), a calculation process of the total moved distance from the running start, a calculation process of the elapsed time, and a measurement process of the footstep count are performed repeatedly, and then the total moved distance, the elapsed time, the lap time, and the distance to the next check position (CP) and the goal are updated sequentially and displayed (steps SA, S5, and S6).

Subsequently, when it is determined that the user has made a turn at the street corner (herein the first check position) in accordance with the bend determination process described later (steps SB, S7 (Yes)), the current positional data (latitude and longitude) acquired from the GPS receiving unit 24 and stored in the current position memory 23b is corrected to the latitude and longitude data corresponding to the first check position set in the next street corner memory 23i (step S9). This is intended to detect that the user has passed the street corner and to modify the data to an accurate position because an error of several meters to tens of meters may occur in a position obtained by the GPS depending on a receiving condition.

In addition, the moved distance data stored in the total moved distance memory 23d is corrected to the distance data corresponding to the first check position set in the next street corner memory 23i (step S10). This is intended to detect that the user has passed the street corner and to modify the data to an accurate value because an error occurs in the position obtained from the GPS and in the distance calculated from the output of the motion sensor unit 26.

The user's step is then calculated and stored in the step memory 23k by dividing the distance from the start position to the first check position set in the next street corner memory 23i by an actual footstep count to the first check position stored in the footstep count memory 23j (step S11).

The latitude and longitude data and the distance data corresponding to the next check position (herein a second check position) are then set (stored) in the next street corner memory 23i (step S12).

At this time, the distance corresponding to the first check position is subtracted from the distance corresponding to the second check position or the distance of the set course, and the resulting distance is displayed as a distance to the next check position (CP) or a distance to the goal on the display unit 12 in response to user operations.

Subsequently, returning to the process from the step SA, the calculation of the total moved distance based on the positioning data from the GPS receiving unit 24 and the update process thereof, the update process of the elapsed time, and the footstep count measurement process based on the sensor signal from the motion sensor unit 26 are performed repeatedly until it is determined that the user has made a turn at the street corner corresponding to the second check position (steps SA to S8→SA).

Subsequently, in a similar way to the above-described steps, a process for correcting the latitude and longitude data of the current position stored in the current position memory 23b (step S9), a process for correcting the total moved distance data stored in the total moved distance memory 23d (step S10), a process for calculating the latest step (step S11), and a process for setting a next check position (step S12) are performed repeatedly every time it is determined that the user has made a turn at the next check position (street corner) set in the next street corner memory 23i, such as the second check position, a third check position, and so on (step S7 (Yes)).

Accordingly, for example, as illustrated in FIG. 5, since the total moved distance after the start based on the set running course is corrected in accordance with the distance to each check position specified on the running course every time the user passes the check positions 1, 2, and so on which are each transit point, sufficiently precise moved distances can be calculated and displayed even if the moved distance from the passed check position to the next check position is calculated and added based on the positioning data (a difference of the positional data sampled) acquired from the GPS receiving unit 24.

Next, the moved distance measurement process (step SA) of FIG. 8 will be described in detail with reference to FIGS. 9 and 10.

FIG. 9 is a flow chart illustrating a check flag setting process for the positional data acquired at regular intervals from the GPS receiving unit 24 of the electronic device 10.

The check flag setting process is performed in response to the positional data being acquired from the GPS receiving unit 24 at regular intervals (one second). When the bend determination process (refer to FIGS. 11 to 15) described later determines that the user has made a turn at a street corner (step A11 (Yes)) and when the bend determination process determines that there has been no determination that the user has made a turn at the street corner during an interval (for example, four seconds) or more (step A12 (Yes)), a check flag is set in the positional data stored in the current position memory 23b (step A13). On the other hand, when the bend determination process does not determine that the user has made a turn (step A11 (No)) and when the bend determination process further does not determine that the user has not made a turn during the interval or more (step A12 (No)), a check flag is not set in the positional data stored in the current position memory 23b (step A14).

FIG. 10 is a flow chart illustrating the moved distance measurement process of the electronic device 10 in the runner support mode.

When positional data is acquired from the GPS receiving unit 24 at regular intervals (one second) and stored in the current position memory 23b, a moved distance according to a difference between the positional data in which the final check flag stored in the final check flag position memory 23c is set and the positional data stored in the current position memory 23b is calculated (step A21).

The current total moved distance is calculated by the moved distance calculated this time being added to the total moved distance stored in the total moved distance memory 23d in accordance with the last moved distance measurement process. When it is confirmed that the current total moved distance is longer than the last total moved distance (step A22 (Yes)), the total moved distance stored in the total moved distance memory 23d is updated to the current total moved distance (step A23).

When a check flag is set in the positional data stored in the current position memory 23b (step A24 (Yes)), the positional data is stored in the final check flag position memory 23c as positional data in which the final check flag is set (step A25).

This allows making the positional data including an error obtained from the GPS receiving unit 24 a straight shape as much as possible to calculate the moved distance, and precise calculation of the moved distance at a point where the course is bent.

When positioning precision of the positioning data acquired from the GPS receiving unit 24 is bad or when the positioning data itself is not acquired, the moved distance is calculated from the footstep count (23j) and the step (22k) acquired based on the sensor signal from the motion sensor unit 26, and the calculated moved distance is added to the previous total moved distance to update the total moved distance.

Next, the bend determination process (step SB) of FIG. 8 will be described in detail.

FIG. 11 is a flow chart illustrating an overall process of the bend determination process of the electronic device 10 in the runner support mode.

The bend determination process is performed in accordance with a sampling interval (one second) of the positioning data from the GPS receiving unit 24, and includes a GPS bend detection process (step B1), a geomagnetism bend detection process (step B2), an integrated bend detection process (step B3), and a reference value update process (step B4). Each of the processes will be described in detail with reference to FIGS. 12 to 15.

FIG. 12 is a flow chart illustrating the GPS bend detection process of step B1.

When the positioning data is acquired from the GPS receiving unit 24 at regular intervals (one second), it is determined whether positioning precision of the positioning data is good (OK) or bad (NG) (step B11).

When the positioning precision of the GPS receiving unit 24 is determined to be good (OK) (step B11 (Yes)), a moving vector (current direction data [deg]) is calculated based on the current positional data acquired from the present positioning data and the last positional data, and stored in the GPS current direction memory 23f (refer to FIG. 6) (step B12).

Then, a difference (change) between the reference direction data [deg] stored in the GPS reference direction memory 23e (refer to FIG. 6) and the current direction data [deg] is calculated (step B13) to determine whether the difference is equal to or greater than a bend detection threshold value [50°] (step B14).

When it is determined that the difference (change) is equal to or greater than the bend detection threshold value [50°] (step B14 (Yes)), it is detected that the runner has passed a street corner (step B15).

On the other hand, when it is determined in the above-described step B11 that the positioning precision is bad (NG) (step B11 (No)) and when it is determined in the above-described step B14 that the difference (change) is less than the threshold value (step B14 (No)), then the process is performed as a bend being not detected by the GPS (step B16).

While the bend detection (GPS) process is configured to calculate the current direction data (moving vector) from the last and present positional data acquired from the GPS receiving unit 24, the bend detection (GPS) process may be configured to calculate a velocity vector by the Doppler effect to estimate the current direction data.

FIG. 13 is a flow chart illustrating a geomagnetism bend detection process of step B2.

When the geomagnetic data is acquired from the geomagnetic sensor unit 25 at regular intervals (one second), it is determined whether disturbance occurs in the current geomagnetism (step B21).

When it is determined that the current geomagnetism is free of disturbance (step B21 (Yes)), an average value (two-second average) of the geomagnetic data measured every 0.2 second in association with an immediately preceding two-second movement is calculated and stored in the geomagnetic current value memory 23h as the current geomagnetic data [μT] (refer to FIG. 7) (step B22).

Since each of the measured three-axis geomagnetic data is stored with a flag with/without disturbance being set, when the two-second average is calculated, geomagnetic data in which the flag with disturbance is set is complemented and calculated by immediately preceding geomagnetic data in which the flag without disturbance is set.

Next, a difference (change) between the reference geomagnetic data [μT] stored in the geomagnetic reference value memory 23g (refer to FIG. 7) and the current geomagnetic data [μT] stored in the geomagnetic current value memory 23h is calculated (step B23) to determine whether the difference (change) is equal to or greater than a predetermined bend detection threshold value [15 μT] (step B24).

Regarding at least two-axis data among each of the three-axis current geomagnetic data [μT], when it is determined that the difference (change) is equal to or greater than the bend detection threshold value [15 μT] (step B24 (Yes)), it is detected that the runner has passed a street corner (step B25).

On the other hand, when it is determined in the above-described step B21 that the geomagnetic data acquired from the geomagnetic sensor unit 25 is not free of disturbance (step B21 (No)), and when it is determined in the above-described step B24 that the change is less than the threshold value regarding at least two-axis data among each of the three-axis geomagnetic data (step B24 (No)), the process is performed as a bend being not detected by geomagnetism (step B26).

FIG. 14 is a flow chart illustrating an integrated bend detection process of step B3. This process finally determines the presence of a bend based on the GPS bend detection process and the geomagnetism bend detection process.

The integrated bend detection process prohibits bend determination while the runner is at a stop and during a given period of time (for example, five seconds) after a bend is detected by the GPS bend detection process or the geomagnetism bend detection process to prevent wrong determination during a stop and wrong determination of making a turn twice at one street corner.

First, it is determined whether the runner is at a stop by checking whether the positional data acquired from the GPS receiving unit 24 includes a change, or checking whether the runner's running motion is detected by various sensor signals acquired from the motion sensor unit 26 (step B31).

When it is determined that the runner is not at a stop but is moving (step B31 (No)), it is determined whether the process is in the determination prohibition period of the given period of time after the bend is detected last time in the GPS bend detection process or the geomagnetism bend detection process (step B32).

When a counter that counts the given period of time (five seconds) after detection of the last bend reaches full count and is at a stop, it is determined that the process is not in the determination prohibition period (step B32 (No)). It is then determined whether passage of the street corner by the runner is detected in the GPS bend detection process or the geomagnetism bend detection process (steps B33 and B34).

When it is determined that either of the GPS bend detection process or the geomagnetism bend detection process detects that the runner has passed the street corner (step B33 (Yes) or B34 (Yes)), the counter of the given period of time (five seconds) is reset, and counting of the determination prohibition period starts (step B35).

Then, it is finally determined that the runner has passed the street corner (step B36).

On the other hand, when it is determined in the above-described step B31 that the runner is at a stop (step B31 (Yes)), or when it is determined in the above-described step B32 that the counter of the given period of time (five seconds) is counting and that the process is in the determination prohibition period (step B32 (Yes)), or when it is determined that neither the GPS bend detection process nor the geomagnetism bend detection process detects that the runner has passed a street corner (steps B33 and B34 (No)), the process is performed as a bend being not determined (step B37).

FIG. 15 is a flow chart illustrating a reference value update process for updating reference direction data stored in the GPS reference direction memory 23e and reference geomagnetic data stored in the geomagnetic reference value memory 23g.

In the reference value update process, first, when it is determined that either of the GPS bend detection process or the geomagnetism bend detection process detects that the runner has passed a street corner (step B41 (Yes) or B42 (Yes)), the current direction data [deg] stored in the GPS current direction memory 23f is stored as-is in the GPS reference direction memory 23e to update the reference direction data [deg], and the current geomagnetic data [μT] stored in the geomagnetic current value memory 23h is stored as-is in the geomagnetic reference value memory 23g to update the reference geomagnetic data [μT] (step B43).

Next, in step B11 of the GPS bend detection process (refer to FIG. 12), when the positioning precision of the positioning data acquired from the GPS receiving unit 24 is determined to have restored from the bad "NG" condition to the good "OK" condition (step B44 (Yes)), the current direction data [deg] stored in the GPS current direction memory 23f is stored as-is in the GPS reference direction memory 23e to update the reference direction data [deg] (step B45).

In step B21 of the geomagnetism bend detection process (refer to FIG. 13), when it is also determined that each of the three-axis geomagnetic data acquired from the geomagnetic sensor unit 25 has restored from the condition "with" disturbance to the condition "without" disturbance (step B44 (Yes)), the current geomagnetic data [μT] stored in the geomagnetic current value memory 23h is stored as-is in the geomagnetic reference value memory 23g to update the reference geomagnetic data [μT] (step B45).

According to the above configuration of the electronic device 10, since a given period of time is specified to be the determination prohibition period when either of the GPS receiving unit 24 or the geomagnetic sensor unit 25 determines that the runner has passed a street corner, multiple times of bend detection at one street corner can be prevented.

Therefore, it is possible to accurately determine that the runner has passed a street corner in a running course optionally set by the user, and each time positional data and distance data at a check position corresponding to the street corner can be corrected to an accurate value.

When the positioning precision of the positioning data acquired from the GPS receiving unit 24 is bad, determination of a bend based on this data is not performed. When disturbance occurs in the geomagnetic data acquired from the geomagnetic sensor unit 25, determination of a bend based on this data is not performed.

The above-described embodiments are configured to perform all the processes by the running condition detection function including the moved distance measurement process and the bend determination process described with reference to FIGS. 8 to 15 inside the electronic device 10 in accordance with the electronic device control program 22a.

In contrast, the electronic device 10 may be configured to receive and display data, such as the highly precise current position and the total moved distance analyzed by a server device on a network performing processes by causing the server to include each of the functions (22a) and databases (22b) and by transmitting, from the input/output interface 28 to the server device, the user operation signal from the key input unit 11 of the electronic device 10, the positioning data acquired from the GPS receiving unit 24, each of the three-axis geomagnetic data acquired from the geomagnetic sensor unit 25, and each sensor signal acquired from the motion sensor unit 26.

Techniques and databases of each process performed by the electronic device 10 described in each of the embodiments, that is, each technique, such as the running condition detection process illustrated in the flow chart of FIG. 8, the check flag setting process illustrated in the flow chart of FIG. 9, the moved distance measurement process associated with the running condition detection process illustrated in the flow chart of FIG. 10, and the bend determination process associated with the running condition detection process illustrated in the flow charts of FIGS. 11 to 15, and a database including the map data (course information) 22*b* may all be a program that a computer can execute, and may be stored in an external recording medium (not shown), such as a memory card including a read only memory (ROM) card and a random access memory (RAM) card, a magnetic disk including a floppy disk and a hard disk, an optical disk including a compact disk read only memory (CD-ROM) and a digital versatile disk (DVD), and a semiconductor memory for distribution. A computer, which is the portable electronic device including the GPS receiving unit 24, the geomagnetic sensor unit 25, and the motion sensor unit 26, can achieve the highly precise running condition detection function described in the embodiments and perform similar processes in accordance with the techniques described above by loading the program recorded in the external recording medium into the storage device 22 and by the loaded program controlling the operation.

The data of the program for achieving each of the above-described techniques can be transmitted over a network N in a form of a program code. The highly precise running condition detection function described above can also be achieved by downloading this program data by communication into the computer of the portable electronic device including the GPS receiving unit 24, the geomagnetic sensor unit 25, and the motion sensor unit 26.

The present invention is not limited to each of the embodiments described above. Various modifications may be made in an implementation stage without departing from the spirit of the invention. Furthermore, aspects of the present invention in various stages are included in each of the above-described embodiments, and various aspects of the present invention may be extracted by an appropriate combination of a plurality of constituent features disclosed. For example, even when some constituent features are deleted from all constituent features described in each embodiment, or some constituent features are combined in a different form, when the problem described in the section of Description of the Related Art can be solved and the effect described in the section of Advantage of the Invention is obtained, the configuration with the constituent features deleted or combined may be extracted as aspects of the present invention.

FIG. 1
FROM START>5.5 km
ELAPSED TIME>33:00
TO GOAL>4.5 km
FIG. 2
11: KEY INPUT UNIT
12: DISPLAY UNIT
24: GPS RECEIVING UNIT
25: GEOMAGNETIC SENSOR UNIT
26: MOTION SENSOR UNIT
27: ANALYSIS DATA STORAGE UNIT
28: INPUT/OUTPUT INTERFACE
22: STORAGE DEVICE
22*a*: CONTROL PROGRAM
22*b*: MAP DATA (COURSE DATA)
23*a*: DISPLAY DATA
23*b*: CURRENT POSITION
23*c*: FINAL CHECK FLAG POSITION
23*d*: TOTAL MOVED DISTANCE
23*e*: GPS REFERENCE DIRECTION
23*f*: GPS CURRENT DIRECTION
23*g*: GEOMAGNETIC REFERENCE VALUE (THREE-VALUE)
23*h*: GEOMAGNETIC CURRENT VALUE (THREE-VALUE)
23*i*: NEXT STREET CORNER
23*j*: FOOTSTEP COUNT
23*k*: STEP
FIG. 3
GEOMAGNETIC SAMPLING DATA
X-AXIS (TWO-SECOND AVERAGE)
Y-AXIS (TWO-SECOND AVERAGE)
Z-AXIS (TWO-SECOND AVERAGE)
FIG. 4
START POSITION
CHECK POSITION 1
CHECK POSITION 2
GOAL POSITION
FIG. 5
START POSITION
CHECK POSITION 1
CHECK POSITION 2
CHECK POSITION 3
CHECK POSITION 4
GOAL POSITION
FIG. 6
GPS REFERENCE DIRECTION/CURRENT DIRECTION
BEND DETECTION THRESHOLD VALUE 50°
COUNTER
REFERENCE VALUE
CURRENT VALUE
FIG. 7
GEOMAGNETIC REFERENCE VALUE/CURRENT VALUE
BEND DETECTION THRESHOLD VALUE 50 µT
(APPLIED TO EACH XYZ AXIS)
COUNTER
GEOMAGNETISM
REFERENCE VALUE
FIG. 8
RUNNING CONDITION DETECTION PROCESS
S1: SET COURSE
S2: SET FIRST CHECK POSITION
S3: START BUTTON?
S4: GPS RECEIVING UNIT, GEOMAGNETIC SENSOR UNIT, AND MOTION SENSOR UNIT START OPERATIONS
SA: GPS→MEASURE MOVED DISTANCE
S5: CALCULATE ELAPSED TIME
S6: MOTION→MEASURE FOOTSTEP COUNT
SB: GPS/GEOMAGNETISM→DETERMINE STREET CORNER
S7: STREET CORNER?
S8: STOP BUTTON?
S9: CORRECT GPS-ACQUIRED POSITION
S10: CORRECT MOVED DISTANCE
S11: CALCULATE STEP
S12: SET NEXT CHECK POSITION

FIG. 9
CHECK FLAG SETTING PROCESS
A11: TURN?
A12: DETERMINED THAT THERE HAS BEEN NO TURN DURING CERTAIN PERIOD OR MORE?
A13: SET CHECK FLAG
A14: SET NO CHECK FLAG
FIG. 10
MOVED DISTANCE MEASUREMENT PROCESS
A21: CALCULATE COORDINATE DIFFERENCE (FINAL CHECK FLAG POSITION⇔ CURRENT POSITION)
A22: CURRENT MOVED DISTANCE>PAST MOVED DISTANCE?
A23: UPDATE TOTAL MOVED DISTANCE
A24: CURRENT POSITION="CHECK FLAG IS SET"?
A25: STORE CURRENT POSITION COORDINATES ⇒ USE AS FINAL CHECK
FLAG POSITION
END
FIG. 11
BEND DETERMINATION PROCESS
B1: BEND DETECTION (GPS)
B2: BEND DETECTION (GEOMAGNETISM)
B3: BEND DETECTION (INTEGRATED)
B4: UPDATE REFERENCE VALUE
END
FIG. 12
BEND DETECTION (GPS) PROCESS
B11: GPS PRECISION OK?
B12: CALCULATE MOVING VECTOR
B13: CALCULATE DIFFERENCE OF MOVING DIRECTION (DIFFERENCE FROM REFERENCE VALUE)
B14: MOVING DIRECTION CHANGE IS EQUAL TO OR GREATER THAN THRESHOLD VALUE?
B15: DETECTED AS BEND (GPS)
B16: BEND NOT DETECTED
FIG. 13
BEND DETECTION (GEOMAGNETISM) PROCESS
B21: IS GEOMAGNETISM FREE OF DISTURBANCE?
B22: CALCULATE MOVING AVERAGE (ELIMINATE INFLUENCE OF SWINGING ARM)
B23: CALCULATE DIFFERENCE OF CHANGE (DIFFERENCE FROM REFERENCE VALUE)
B24: DIFFERENCE OF CHANGE IS EQUAL TO OR GREATER THAN THRESHOLD VALUE?
B25: DETECTED AS BEND (GEOMAGNETISM)
B26: BEND NOT DETECTED
FIG. 14
BEND DETECTION (INTEGRATED) PROCESS
B31: STOP?
B32: BEND DETERMINATION PROHIBITED?
B33: BEND (GPS) DETECTED?
B34: BEND (GEOMAGNETISM) DETECTED?
B35: RESET BEND DETERMINATION-PROHIBITING COUNTER
B36: DETERMINED AS BEND (INTEGRATED)
B37: BEND NOT DETERMINED
FIG. 15
REFERENCE VALUE UPDATE PROCESS
B41: BEND (GPS) DETECTED?
B42: BEND (GEOMAGNETISM) DETECTED?
B43: UPDATE REFERENCE VALUE (GPS, GEOMAGNETISM)
B44: GPS OR GEOMAGNETISM LOST→RESTORED?
B45: UPDATE REFERENCE VALUE
END

What is claimed is:
1. A running condition detection device comprising:
a GPS receiving unit which receives a global positioning system (GPS) signal and outputs positional data indicating a current position;
a geomagnetic sensor which detects geomagnetic data indicating geomagnetism; and
a processor which is configured to:
perform control to memorize, in a memory, course data of a course on which a user moves, the course data including corner data indicating a position of a corner of the course;
obtain moving directions based on plural pieces of positional data from the GPS receiving unit, wherein the plural pieces of positional data are obtained at respective different times;
perform a first determination to determine whether the user passes through a corner of a piece of the course data based on a change of the obtained moving directions;
perform a second determination to determine whether the user passes through the corner of the piece of the course data based on a change of geomagnetism detected by the geomagnetic sensor;
prohibit the first determination and the second determination from being performed during a given period of time in a case in which it is determined that the user passes through the corner of the piece of the course data based on at least one of the first determination and the second determination; and
correct the current position output from the GPS receiving unit based on the position of the corner of the piece of the course data in a case in which it is determined by one of the first determination and the second determination that the user passes through the corner of the piece of the course data.

2. The running condition detection device according to claim 1, wherein the processor is further configured to:
determine whether precision of the current positional data output from the GPS receiving unit is within a predetermined error range;
determine whether the geomagnetic data detected by the geomagnetic sensor is free of disturbance;
prohibit the first determination from being performed in a case in which it is determined that precision of the current positional data is not within the predetermined error range; and
prohibit the second determination from being performed in a case in which it is determined that the geomagnetic data is not free of disturbance.

3. The running condition detection device according to claim 1, wherein:
the corner data of the course data includes a plurality of street corners associated with a distance from a start of the course; and
the processor is further configured to:
calculate a total moved distance from the start along the course; and
when it is determined by one of the first determination and the second determination that the user passes through one of the corners, replace the calculated moved distance from the start with a distance on the course associated with said one of the corners of the course data.

4. The running condition detection device according to claim 1, wherein the processor is further configured to:
store the current positional data acquired from the GPS receiving unit as a check position when it is not determined for a given period of time that the user passes through the corner of the piece of the course data by the first determination and the second determination; and
calculate a moved distance during running based on the current positional data output from the GPS receiving unit and the stored check position.

5. The running condition detection device according to claim 1, wherein the processor is further configured to acquire the geomagnetic data detected by the geomagnetic sensor as data averaged in a predetermined period, wherein in the second determination, the processor compares the acquired averaged geomagnetic data and reference geomagnetic data to determine that the user passes the corner of the piece of the course data.

6. A method for detecting a running condition using a global positioning system (GPS) receiving unit which receives a GPS signal and outputs positional data indicating a current position, and a geomagnetic sensor which detects geomagnetic data indicating geomagnetism, the method comprising:
performing control to memorize, in a memory, course data of a course on which a user moves, the course data including corner data indicating a position of a corner of the course;
obtaining moving directions based on plural pieces of positional data from the GPS receiving unit, wherein the plural pieces of positional data are obtained at respective different times;
performing a first determination to determine whether the user passes through a corner of a piece of the course data based on a change of the obtained moving directions;
performing a second determination to determine whether the user passes through the corner of the piece of the course data based on a change of geomagnetism detected by the geomagnetic sensor;
prohibiting the first determination and the second determination from being performed during a given period of time in a case in which it is determined that the user passes through the corner of the piece of the course data based on at least one of the first determination and the second determination; and
correcting the current position output from the GPS receiving unit based on the position of the corner of the piece of the course data in a case in which it is determined by one of the first determination and the second determination that the user passes through the corner of the piece of the course data.

7. The method according to claim 6, further comprising:
determining whether precision of the current positional data output from the GPS receiving unit is within a predetermined error range;
determining whether the geomagnetic data detected by the geomagnetic sensor is free of disturbance;
prohibiting the first determination from being performed in a case in which it is determined that precision of the current positional data is not within the predetermined error range; and
prohibiting the second determination from being performed in a case in which it is determined that the geomagnetic data is not free of disturbance.

8. The method according to claim 6, wherein the corner data of the course data includes a plurality of corners associated with which a distance from a start of the course;

wherein the method further comprises:
calculating a total moved distance from the start when a user moves along the course; and
when it is determined by one of the first determination and the second determination that the user passes through one of the corners, replacing the calculated moved distance from the start with a distance on the course associated with said one of the corners of the course data.

9. The method according to claim 6, further comprising:
storing the current positional data acquired from the GPS receiving unit as a check position when it is not determined for a given period of time that the user passes through the corner of the piece of the course data by the first determination and the second determination; and
calculating a moved distance during running based on the current positional data output from the GPS receiving unit and the check position.

10. The method according to claim 6, further comprising:
acquiring the geomagnetic data detected by the geomagnetic sensor as data averaged in a predetermined period; and
comparing the acquired averaged geomagnetic data and reference geomagnetic data to determine that the user passes through the corner of the piece of the course data in the second determination.

11. A non-transitory computer-readable recording medium having recorded thereon a program that is executable by a computer of an electronic device including a global positioning system (GPS) receiving unit which receives a GPS signal and outputs positional data indicating a current position and a geomagnetic sensor which detects geomagnetic data indicating geomagnetism, the program being executable by the computer to cause the computer to execute functions comprising:
performing control to memorize, in a memory, course data of a course on which a user moves, the course data including corner data indicating a position of a corner of the course;
obtaining moving directions based on plural pieces of positional data from the GPS receiving unit, wherein the plural pieces of positional data are obtained at respective different times;
performing a first determination to determine whether the user passes through a corner of a piece of the course data based on a change of the obtained moving directions;
performing a second determination to determine whether the user passes through the corner of the piece of the course data based on a change of geomagnetism detected by the geomagnetic sensor;
prohibiting the first determination and the second determination from being performed during a given period of time in a case in which it is determined that the user passes through the corner of the piece of the course data based on at least one of the first determination and the second determination; and
correcting the current position output from the GPS receiving unit based on the position of the corner of the piece of the course data in a case in which it is determined by one of the first determination and the second determination that the user passes through the corner of the piece of the course data.

12. The non-transitory computer-readable recording medium according to claim 11, wherein the program further causes the computer to execute functions comprising:
determining whether precision of the current positional data output from the GPS receiving unit is within a predetermined error range;

determining whether the geomagnetic data detected by the geomagnetic sensor is free of disturbance;

prohibiting the first determination from being performed in a case in which it is determined that precision of the current positional data is not within the predetermined error range; and prohibiting the second determination from being performed in a case in which it is determined that the geomagnetic data is not free of disturbance.

13. The non-transitory computer-readable recording medium according to claim 11, wherein the corner data of the course data includes a plurality of street corners associated with a distance from a start of the course;

wherein the program further causes the computer to execute functions comprising:

calculating a total moved distance from the start when a user moves along the course; and when it is determined by one of the first determination and the second determination that the user passes through one of the corners, replacing the calculated moved distance from the start with a distance on the course associated with said one of the corners of the course data.

14. The non-transitory computer-readable recording medium according to claim 11, wherein the program further causes the computer to execute functions comprising:

storing the current positional data acquired from the GPS receiving unit as a check position when it is not determined for a given period of time that the user passes through the corner of the piece of the course data by the first determination and the second determination; and calculating a moved distance during running based on the current positional data output from the GPS receiving unit and the check position.

15. The non-transitory computer-readable recording medium according to claim 11, wherein the program further causes the computer to execute functions comprising:

acquiring the geomagnetic data detected by the geomagnetic sensor as data averaged in a predetermined period; and comparing the acquired averaged geomagnetic data and reference geomagnetic data to determine that the user passes through the corner of the piece of the course data in the second determination.

* * * * *

UNITED STATES PATENT AND TRADEMARK OFFICE
CERTIFICATE OF CORRECTION

| | | |
|---|---|---|
| PATENT NO. | : 9,234,767 B2 | |
| APPLICATION NO. | : 14/168711 | |
| DATED | : January 12, 2016 | |
| INVENTOR(S) | : Takeshi Matsue | |

It is certified that error appears in the above-identified patent and that said Letters Patent is hereby corrected as shown below:

In the claims,

Column 16, line 57, before "corners" delete "street".

Column 19, line 12, before "corners" delete "street".

Signed and Sealed this
Twenty-sixth Day of April, 2016

Michelle K. Lee
*Director of the United States Patent and Trademark Office*